United States Patent
Schümann et al.

(10) Patent No.: US 9,834,707 B2
(45) Date of Patent: Dec. 5, 2017

(54) REACTIVE 2-COMPONENT ADHESIVE SYSTEM

(71) Applicant: TESA SE, Norderstedt (DE)

(72) Inventors: Uwe Schümann, Pinneberg (DE); Kai Ellringmann, Hamburg (DE); Duc Hung Nguyen, Hamburg (DE); Clementine Pradier, Sainte Foy les Lyon (FR)

(73) Assignee: tesa SE, Norderstedt (DE)

( * ) Notice: Subject to any disclaimer, the term of this patent is extended or adjusted under 35 U.S.C. 154(b) by 0 days.

(21) Appl. No.: 15/033,244

(22) PCT Filed: Oct. 2, 2014

(86) PCT No.: PCT/EP2014/071172
§ 371 (c)(1),
(2) Date: Apr. 29, 2016

(87) PCT Pub. No.: WO2015/062809
PCT Pub. Date: May 7, 2015

(65) Prior Publication Data
US 2016/0264823 A1  Sep. 15, 2016

(30) Foreign Application Priority Data
Nov. 1, 2013 (DE) .......... 10 2013 222 278

(51) Int. Cl.
| | | |
|---|---|---|
| *C09J 7/02* | (2006.01) |
| *C09J 175/04* | (2006.01) |
| *C09J 133/14* | (2006.01) |
| *C09J 4/06* | (2006.01) |
| *C09J 133/06* | (2006.01) |
| *B05D 5/00* | (2006.01) |
| *C08K 5/00* | (2006.01) |
| *C08K 5/14* | (2006.01) |

(52) U.S. Cl.
CPC .............. *C09J 7/0225* (2013.01); *B05D 5/00* (2013.01); *C09J 4/06* (2013.01); *C09J 133/06* (2013.01); *C09J 133/14* (2013.01); *C09J 175/04* (2013.01); *B05D 2203/22* (2013.01); *B05D 2502/005* (2013.01); *B05D 2503/00* (2013.01); *C08K 5/0091* (2013.01); *C08K 5/14* (2013.01); *C09J 2433/00* (2013.01); *C09J 2475/00* (2013.01)

(58) Field of Classification Search
CPC ...... C09J 7/0225; C09J 133/14; C09J 175/04; C09J 2475/00; C09J 2433/00
See application file for complete search history.

(56) References Cited

U.S. PATENT DOCUMENTS

| | | | | |
|---|---|---|---|---|
| 4,898,899 A | * | 2/1990 | Isobe .................. | C09J 4/00 524/90 |
| 2010/0062260 A1 | * | 3/2010 | Takano ................ | B32B 7/12 428/416 |

FOREIGN PATENT DOCUMENTS

| | | | | |
|---|---|---|---|---|
| JP | H02 263880 A | | 10/1990 | |
| JP | H02263880 | * | 10/1990 | ............... C09J 4/02 |

OTHER PUBLICATIONS

International Search Report dated Nov. 27, 2014, dated Dec. 3, 2014.

* cited by examiner

*Primary Examiner* — Robert Harlan
(74) *Attorney, Agent, or Firm* — Norris, McLaughlin & Marcus, P.A.

(57) ABSTRACT

The invention relates to a novel, reactive 2-component adhesive system, preferably in film form, for adhering diverse materials, such as for example, metal, wood, glass and/or plastic.

13 Claims, No Drawings

REACTIVE 2-COMPONENT ADHESIVE SYSTEM

This application is a 371 of International Patent Application No. PCT/EP2014/071172, filed Oct. 2, 2014, which claims foreign priority benefit under 35 U.S.C. §119 of the German Patent Application No. 10 2013 222 278.5, filed Nov. 1, 2013, the disclosures of which patent applications are incorporated herein by reference.

TECHNICAL FIELD OF THE INVENTION

The present invention relates to a 2-component adhesive system, preferably in film form, for adhesively bonding various materials, such as, for example, metal, wood, glass and/or plastics material. This 2-component adhesive system comprises two reactive adhesive components A and B, preferably in film form, each of which comprises at least one reactive monomer or reactive resin (a), wherein the first adhesive component additionally comprises at least one radical initiator (c) and the second adhesive component additionally comprises at least one activator (b). Alternatively, this two-component adhesive system can comprise two reactive adhesive components A and B, preferably in film form, wherein the first adhesive component comprises (a) at least one reactive monomer and at least one radical initiator (c) and the second adhesive component B comprises an activator (b). According to the invention there is provided as the activator a manganese(II) complex, an iron(II) complex or a cobalt(II) complex, in each case with a compound selected from porphyrin, porphyrazine or phthalocyanine or a derivative of one of those compounds as ligand.

The 2-component adhesive system according to the invention can be used either in the form of adhesive compositions or preferably in film form. If a 2-component adhesive system is to be used in film form, a polymeric film former matrix is added to the two reactive adhesive components A and B as described above.

There are additionally provided a method for producing the reactive adhesive systems according to the invention, as described above, and a kit for preparing the reactive adhesive system according to the invention, comprising a first and a second reactive adhesive component, as described above.

GENERAL PRIOR ART

2-Component adhesive systems have been known in general for many years and are described extensively in the specialist literature. In such systems, an adhesive system consisting of two components is applied to the parts to be adhesively bonded, wherein two liquid components are conventionally used. For example, in chemically reacting 2-component polymerization adhesive systems, one component consists of the monomer to be polymerized and an activator, and the other component consists of a radical-forming substance (also called a curing agent or initiator) and the monomer to be polymerized. After the two components have been thoroughly mixed, or at least brought into contact, and activated, which in most cases is carried out thermally, the radical-forming substance is cleaved into two radicals by the activator and the polymerization reaction of the monomers to be polymerized begins. The radical chain polymerization of the monomer then takes place to chain termination and the adhesive composition cures, whereby permanent adhesive bonding of the parts to be adhesively bonded is achieved.

A disadvantage of such liquid 2-component polymerization adhesive systems is that they are often not clean to use since the two components in most cases have to be applied in liquid to pasty form to the parts to be adhesively bonded. This is a problem above all in the case of adhesive bonds over large areas and/or in applications in which the surfaces are uneven, for example sloping. In addition, activation of the adhesive system generally takes place at elevated temperatures, which can be a problem for sensitive substrates, such as, for example, anodized aluminum. A further disadvantage of such systems is that long curing times can restrict their use and the storage stability of the two components can be critical. Moreover, conventional 2-component polymerization adhesive systems are frequently accompanied, following complete curing, by problems which only become apparent in the case of vibrations. For example, in the case of the systems of the prior art, cracks or fractures can occur in the region of the adhesive bonds due to powerful vibrations.

OBJECT OF THE PRESENT INVENTION

Accordingly, the object underlying the present invention is to provide an improved reactive 2-component adhesive system. Against this background, the present invention proposes a reactive 2-component adhesive system for adhesively bonding various materials, in order to avoid the above-described problems of the known liquid 2-component adhesive systems.

There is provided in particular a reactive 2-component adhesive system which is easy to handle and ideally already exhibits tackiness, so that there is no slipping when it is applied to the substrates to be adhesively bonded and more precise adhesive bonding is possible than with the liquid 2-component polymerization adhesive systems known in the prior art.

SUMMARY OF THE INVENTION

The present invention relates to a reactive adhesive system comprising at least two reactive adhesive components A and B, wherein the first adhesive component A comprises at least one reactive monomer or reactive resin (a) and a radical initiator (c) and the second adhesive component B comprises at least one reactive monomer or reactive resin (a) and an activator (b), wherein the activator (b) comprises a manganese(II) complex, iron(II) complex or cobalt(II) complex, in each case with a compound selected from porphyrin, porphyrazine or phthalocyanine or a derivative of one of those compounds as ligand.

Alternatively there is provided a reactive adhesive system comprising at least two reactive adhesive components A and B, wherein the first adhesive component A comprises at least one reactive monomer or reactive resin (a) and a radical initiator (c) and the second adhesive component B comprises only an activator (b), wherein the activator (b) comprises a manganese(II) complex, iron(II) complex or cobalt(II) complex, in each case with a compound selected from porphyrin, porphyrazine or phthalocyanine or a derivative of one of those compounds as ligand.

The reactive adhesive system according to the invention is preferably provided in film form. This is achieved in that the reactive adhesive system comprises at least two reactive adhesive components (or adhesive films) A and B, wherein the first adhesive component A comprises at least one reactive monomer or reactive resin (a), a radical initiator (c) and a polymeric film former matrix (d) and the second adhesive component B comprises at least one reactive monomer or reactive resin (a), an activator (b) and a polymeric film former matrix (d), wherein the activator (b) comprises a manganese(II) complex, iron(II) complex or cobalt(II) complex, in each case with a compound selected from porphyrin, porphyrazine or phthalocyanine or a derivative of one of those compounds as ligand.

According to the invention, manganese(II) phthalocyanine, iron(II) phthalocyanine or cobalt(II) phthalocyanine is particularly preferably used as the activator (c) in the reactive adhesive systems described herein.

This reactive adhesive system is suitable as a 2-component polymerization adhesive system, preferably in film form, for the improved adhesive bonding of various materials.

DETAILED DESCRIPTION OF THE INVENTION

The object described above is achieved according to the invention by means of a reactive adhesive system comprising two reactive adhesive components, preferably two reactive adhesive films, which is characterized in that a specific activator (b), namely a manganese(II) complex, an iron(II) complex or a cobalt(II) complex, in each case with a compound selected from porphyrin, porphyrazine or phthalocyanine or a derivative of one of those compounds as ligand, is used. Manganese(II) phthalocyanine, iron(II) phthalocyanine or cobalt(II) phthalocyanine is particularly preferably used.

In one embodiment according to the invention, the reactive adhesive system comprises at least two reactive adhesive components A and B, wherein the first adhesive component A comprises at least one reactive monomer or reactive resin (a) and a radical initiator (c) and the second adhesive component comprises at least one reactive monomer or reactive resin (a) and an activator (b) and wherein the activator (b) comprises a manganese(II) complex, iron(II) complex or cobalt(II) complex, in each case with a compound selected from porphyrin, porphyrazine or phthalocyanine or a derivative of one of those compounds as ligand.

In an alternative embodiment according to the invention, the reactive adhesive system comprises at least two reactive adhesive components A and B, wherein the first reactive adhesive component A comprises at least one reactive monomer or reactive resin (a) and a radical initiator (c) and the second adhesive component comprises an activator (b) and wherein the activator (b) comprises a manganese(II) complex, iron(II) complex or cobalt(II) complex, in each case with a compound selected from porphyrin, porphyrazine or phthalocyanine or a derivative of one of those compounds as ligand.

In a preferred embodiment, the reactive adhesive system of the present invention is provided in film form:

This adhesive film system comprises in one embodiment at least two reactive adhesive components or adhesive films A and B, wherein the first adhesive component A comprises at least one reactive monomer or reactive resin (a), a radical initiator (c) and a polymeric film former matrix (d) and the second adhesive component comprises at least one reactive monomer or reactive resin (a), an activator (b) and a polymeric film former matrix (d) and wherein the activator (b) comprises a manganese(II) complex, iron(II) complex or cobalt(II) complex, in each case with a compound selected from porphyrin, porphyrazine or phthalocyanine or a derivative of one of those compounds as ligand.

Alternatively, the reactive adhesive system in film form comprises in another embodiment at least two reactive adhesive components or adhesive films A and B, wherein the first adhesive component A comprises an activator (b) and optionally a polymeric film-forming agent (d) and the second adhesive component comprises at least one reactive monomer or reactive resin (a), a radical initiator (c) and a polymeric film former matrix (d) and wherein the activator (c) comprises a manganese(II) complex, iron(II) complex or cobalt(II) complex, in each case with a compound selected from porphyrin, porphyrazine or phthalocyanine or a derivative of one of those compounds as ligand.

Consequently, in one embodiment according to the invention, a reactive adhesive component comprising at least one reactive monomer or reactive resin (a) and an activator (b) is provided, wherein the activator (b) comprises a manganese(II) complex, iron(II) complex or cobalt(II) complex, in each case with a compound selected from porphyrin, porphyrazine or phthalocyanine or a derivative of one of those compounds as ligand.

In an alternative embodiment according to the invention, a reactive adhesive component comprising an activator (b) is provided, wherein the activator (b) comprises a manganese (II) complex, iron(II) complex or cobalt(II) complex, in each case with a compound selected from porphyrin, porphyrazine or phthalocyanine or a derivative of one of those compounds as ligand.

In the above-described embodiments according to the invention, manganese(II) phthalocyanine, iron(II) phthalocyanine or cobalt(II) phthalocyanine is particularly preferably used as the activator (b).

In a further embodiment according to the invention, a method for producing a reactive adhesive system in film form according to the invention is disclosed, wherein the method comprises the following steps:

1. dissolving and/or finely distributing the ingredients in one or more solvent(s) and/or water;
2. mixing the dissolved or finely distributed ingredients;
3. coating a release liner or release paper, a backing material or a pressure sensitive adhesive with the mixture of dissolved or distributed ingredients according to step 2;
4. evaporating the solvent and/or water; and
5. optionally winding the reactive adhesive component into a roll;

wherein the ingredients comprise
   (A) at least one reactive monomer (a), a radical initiator (b) and a polymeric film former matrix (d); or
   (B) at least one reactive monomer (a), an activator (b) and a polymeric film former matrix (d);
   and optionally further additives and/or auxiliary substances.

In another embodiment according to the invention, a kit for preparing the 2-adhesive system according to the invention is provided.

In a further embodiment according to the invention there is disclosed a composite body which is bonded by means of the reactive adhesive system according to the invention or by means of the kit according to the invention.

The components of the adhesive components, preferably adhesive films, according to the invention, or of the adhesive system according to the invention, will be described in detail hereinbelow.

Reactive Monomer or Reactive Resin (a)

As used herein, the reactive monomer or reactive resin (a) is to denote a monomer or resin which is capable in particular of radical chain polymerization.

According to the invention, a suitable reactive monomer is selected from the group consisting of acrylic acid, acrylic acid esters, methacrylic acid, methacrylic acid esters, diacrylates, dimethacrylates, triacrylates, trimethacrylates, higher functional acrylates, higher functional methacrylates, vinyl compounds and/or oligomeric or polymeric compounds having carbon-carbon double bonds.

In a preferred embodiment, the reactive monomer is one or more representatives selected from the group consisting of: methyl methacrylate (CAS No. 80-62-6), methacrylic acid (CAS No. 79-41-4), cyclohexyl methacrylate (CAS No. 101-43-9), tetrahydrofurfuryl methacrylate (CAS No. 2455-24-5), 2-phenoxyethyl methacrylate (CAS No. 10595-06-9), hydroxyalkyl methacrylates, in particular 2-hydroxyethyl methacrylate (CAS No. 868-77-9), 2-hydroxypropyl methacrylate (CAS No. 923-26-2 and 27813-02-1), 4-hydroxybutyl methacrylate (CAS No. 29008-35-3 and 997-46-6), di(ethylene glycol) methyl ether methacrylate (CAS No. 45103-58-0) and/or ethylene glycol dimethacrylate (CAS No. 97-90-5).

In a further preferred embodiment according to the invention, the reactive adhesive component comprises a mixture of cyclohexyl methacrylate, tetrahydrofurfuryl methacrylate, methacrylic acid and ethylene glycol dimethacrylate as the reactive monomers to be polymerized.

In a further preferred embodiment according to the invention, the reactive adhesive component comprises a mixture of 2-phenoxyethyl methacrylate, 2-hydroxyethyl methacrylate, 2-hydroxypropyl methacrylate and ethylene glycol dimethacrylate as the reactive monomers to be polymerized.

In a further preferred embodiment according to the invention, the reactive adhesive component comprises a mixture of 2-phenoxyethyl methacrylate, 2-hydroxyethyl methacrylate and ethylene glycol dimethacrylate as the reactive monomers to be polymerized.

In a further preferred embodiment according to the invention, the reactive adhesive component comprises 2-phenoxyethyl methacrylate as the reactive monomer to be polymerized.

In a further preferred embodiment according to the invention, the reactive adhesive component comprises a mixture of methyl methacrylate, methacrylic acid and ethylene glycol dimethacrylate as the reactive monomers to be polymerized.

In a further preferred embodiment according to the invention, the reactive adhesive component comprises a mixture of 2-phenoxyethyl methacrylate and ethylene glycol dimethacrylate as the reactive monomers to be polymerized.

In a further preferred embodiment according to the invention, the reactive adhesive component comprises a mixture of di(ethylene glycol) methyl ether methacrylate and ethylene glycol dimethacrylate as the reactive monomers to be polymerized.

Oligomeric mono-, di-, tri- and higher-functionalized (meth)acrylates can be chosen as the reactive resin(s). They are very advantageously used in a mixture with at least one reactive monomer.

Each of these preferred embodiments can be combined according to the invention with a thermoplastic polyurethane, such as, for example, Desmomelt 530®, as the polymeric film former matrix (d), as described hereinbelow.

According to the invention, the amount of reactive monomer/reactive monomers/reactive resin/reactive resins is in the range of approximately from 20 to 80% by weight, preferably approximately from 40 to 60% by weight, based on the total mixture of the constituents of the reactive adhesive component. Most preferably, approximately from 40 to 50% by weight of the reactive monomer/reactive monomers/reactive resin/reactive resins, based on the total mixture of the constituents of the reactive adhesive component, are used. The total mixture of the constituents of the reactive adhesive component here denotes the total amount of the components used, which include the reactive monomers or reactive resins (a), the activator (b), the radical initiator (c), the polymeric film former matrix (d) and/or further components which are optionally present, which is obtained as a total (in % by weight).

Activator (b)

As used herein, the term activator denotes a compound which, even at very low concentrations, allows for the first time or accelerates the process of polymerization. Activators can also be called accelerators.

In the present invention there is added to the reactive adhesive component B, in a preferred embodiment to the reactive adhesive film B, an activator which comprises a complex compound with a manganese, iron or cobalt ion as the central atom and a compound containing carbon-nitrogen double bonds as ligand. The compound containing carbon-nitrogen double bonds is in anionic form in the complex compound. The manganese, iron or cobalt ion in the complex compound is doubly positively charged, while the compound containing carbon-nitrogen double bonds is doubly negatively charged. The manganese, iron or cobalt ion in the complex compound replaces in each case two hydrogen atoms which the ligand carried on the nitrogen atoms prior to the reaction to form the complex compound.

In a preferred embodiment, the ligand has a cyclic structure, preferably a porphyrin, porphyrazine or phthalocyanine ring structure. These structures are to be understood as being framework structures. The ligands can optionally carry substituents in place of the hydrogen atoms bonded to carbon atoms. In this case, they are referred to as derivatives of those compounds. Suitable substituents are selected from the group consisting of fluorine, chlorine, bromine, iodine, methyl, ethyl, propyl, isopropyl, butyl, tert-butyl, —OH, —NH$_2$—, —NO$_2$.

A particularly suitable activator comprises iron(II) phthalocyanine (CAS No. 132-16-1).

According to the invention, the amount of activator is in the range of from greater than 0 to approximately 10% by weight, preferably approximately from 0.1 to 5.0% by weight. Most preferably, approximately from 0.2 to 3.0% by weight, yet more preferably from 0.5 to 2.0% by weight, of activator, based on the total mixture of the constituents of the reactive adhesive component, are used. The total mixture of the constituents of the reactive adhesive component here denotes the total amount of the components used, which include the reactive monomers or reactive resins (a), the activator (b), the radical initiator (c), the polymeric film former matrix (d) and/or further components which are optionally present, which is obtained as a total (in % by weight).

Radical Initiator (c)

As used herein, the term initiator, in particular radical initiator or radical-forming substance (or also curing agent), denotes a compound which is able to initiate a polymerization reaction or crosslinking of the adhesive. However, the initiator, in particular radical initiator, participates to a very small extent in the reaction process and consequently does not form a polymer component that determines the properties of the adhesive bond.

In the present invention, an initiator, in particular radical initiator, is added to the at least one first reactive adhesive component of the adhesive system.

Radical initiators are preferred. Any radical initiators known in the prior art can be used. Preferred radical initiators are peroxides, hydroperoxides and azo compounds.

In a particularly preferred embodiment according to the invention, the radical initiator is an organic peroxide or hydroperoxide. α,α-Dimethylbenzyl hydroperoxide, which is also known as cumene hydroperoxide (CAS No. 80-15-9), is particularly preferred. Also preferred are diisopropylbenzene hydroperoxide (CAS No. 26762-93-6), p-menthane hydroperoxide (CAS No. 26762-92-5) and 1,1,3,3-tetramethylbutyl hydroperoxide (CAS No. 5809-08-5).

According to the invention, the amount of radical initiator is in the range of approximately from 3 to 30% by weight, preferably approximately from 8 to 15% by weight, based on the total mixture of the constituents of the reactive adhesive component. Most preferably, approximately from 9 to 11% by weight of radical initiator, based on the total mixture of the constituents of the reactive adhesive component, are used. The total mixture of the constituents of the reactive adhesive component here denotes the total amount of the components used, which include the reactive monomers or reactive resins (a), the activator (b), the radical initiator (c), the polymeric film former matrix (d) and/or further components which are optionally present, which is obtained as a total (in % by weight).

Polymeric Film Former Matrix (d)

The adhesive components according to the invention can alternatively consist of a matrix, called the polymeric film former matrix hereinbelow, in which the reactive monomers to be polymerized and/or reactive resins are contained. Such adhesive components are in film form and are therefore also called adhesive films. The purpose of this matrix is to form an inert basic framework for the reactive monomers and/or adhesive resins so that they are not—as in the prior art—in liquid form and thus able to trigger the mentioned problems, but are incorporated in a film or foil. Easier handling is thus ensured.

Inert in this context means that the reactive monomers and/or reactive resins substantially do not react with the polymeric film former matrix under suitably chosen conditions (e.g. at sufficiently low temperatures).

Suitable film-forming matrices for use in the present invention are preferably selected from the following list: a thermoplastic polymer, such as, for example, a polyester or copolyester, a polyamide or copolyamide, a polyacrylic acid ester, an acrylic acid ester copolymer, a polymethacrylic acid ester, a methacrylic acid ester copolymer, thermoplastic polyurethanes as well as chemically or physically crosslinked substances of the compounds mentioned above. In addition, blends of different thermoplastic polymers can also be used.

Furthermore, elastomers and thermoplastic elastomers on their own or in a mixture are also conceivable as the polymeric film former matrix. Thermoplastic polymers, in particular semi-crystalline thermoplastic polymers, are preferred.

Thermoplastic polymers having softening temperatures of less than 100° C. are particularly preferred. Within this context, the expression softening point denotes the temperature above which the thermoplastic granules adhere to themselves. If the constituent of the polymeric film former matrix is a semi-crystalline thermoplastic polymer, it very preferably has, in addition to its softening temperature (which is associated with the melting of the crystallites), a glass transition temperature of not more than 25° C., preferably not more than 0° C.

In a preferred embodiment according to the invention, a thermoplastic polyurethane is used. The thermoplastic polyurethane preferably has a softening temperature of less than 100° C., in particular less than 80° C.

In a particularly preferred embodiment according to the invention, Desmomelt 530®, which is obtainable commercially from Bayer Material Science AG, 51358 Leverkusen, Germany, is used as the polymeric film former matrix. Desmomelt 530® is a hydroxyl-terminated, largely linear, thermoplastic polyurethane elastomer with a high rate of crystallization.

According to the invention, the amount of polymeric film former matrix is in the range of approximately from 20 to 80% by weight, preferably approximately from 30 to 50% by weight, based on the total mixture of the constituents of the reactive adhesive component. Most preferably, from 35 to 45% by weight, preferably approximately 40% by weight, of the polymeric film former matrix, based on the total mixture of the constituents of the reactive adhesive component, are used. The total mixture of the constituents of the reactive adhesive component here denotes the total amount of the components used, which include the reactive monomers or reactive resins (a), the activator (b), the radical initiator (c), the polymeric film former matrix (d) and/or further components which are optionally present, which is obtained as a total (in % by weight).

Crosslinker

As used herein, the term crosslinker denotes chemical compounds which are capable of providing linear molecule chains with reactive functional groups so that three-dimensionally crosslinked structures are able to form from the two-dimensional structures by the formation of intermolecular bridges.

Typical examples of crosslinkers are chemical compounds which have two or more identical or different functional groups within the molecule or at the two molecule ends and consequently are able to crosslink molecules of the same structure or of different structures with one another. A crosslinker is additionally able to react with the reactive monomer or reactive resin, as defined above, without the occurrence of a polymerization as such. This is because a crosslinker, unlike the activator, as described above, can be incorporated into the polymer network.

In a particularly preferred embodiment according to the invention, ethylene glycol dimethacrylate (CAS No. 97-90-5) is used as a crosslinker and/or reactive monomer (see above).

Preferred crosslinkers are in addition diacrylates, dimethacrylates, triacrylates, trimethacrylates, higher functional acrylates and/or higher functional methacrylates.

Further Constituents of the Reactive Adhesive Components A and/or B

The reactive adhesive films of the present invention can optionally comprise further additives and/or auxiliary substances which are known in the prior art. Examples which may be mentioned here include fillers, colorants, coloring pigments, nucleating agents, rheological additives, blowing agents, adhesion-enhancing additives (adhesion promoters, tackifier resins, adhesives, pressure sensitive adhesives), compounding agents, plasticizers and/or anti-ageing agents, light stabilizers and UV stabilizers, for example in the form of primary and secondary antioxidants.

Reactive Adhesive Components A and B

In a preferred embodiment according to the invention, the at least one first adhesive component A comprises a mixture of the following constituents: thermoplastic polyurethane, in particular Desmomelt 530®, 2-phenoxyethyl methacrylate, 2-hydroxyethyl methacrylate, 2-hydroxypropyl methacrylate, ethylene glycol dimethacrylate and cumene hydroperoxide.

In a further preferred embodiment according to the invention, the at least one first adhesive component comprises a mixture of the following constituents: thermoplastic polyurethane, in particular Desmomelt 530®, 2-phenoxyethyl methacrylate, 2-hydroxyethyl methacrylate, ethylene glycol dimethacrylate and cumene hydroperoxide.

In a further preferred embodiment according to the invention, the at least one first adhesive component A comprises a mixture of the following constituents: phenoxyethyl methacrylate and cumene hydroperoxide.

In a preferred embodiment, the first adhesive component A comprises (i) from 20 to 80% by weight of at least one reactive monomer or reactive resin (a) and from 2 to 30% by weight radical initiator (c), preferably from 40 to 60% by weight of at least one reactive monomer or reactive resin (a) and from 8 to 15% by weight radical initiator (c), or (ii) from 20 to 80% by weight polymeric film former matrix (d), from 20 to 80% by weight of at least one reactive monomer or reactive resin (a) and from 2 to 30% by weight radical initiator (c), preferably from 30 to 50% by weight polymeric film former matrix (d), from 40 to 60% by weight of at least one reactive monomer or reactive resin (a) and from 8 to 15% by weight radical initiator (c), based on the total mixture of the constituents of the reactive adhesive component. The total mixture of the constituents of the reactive adhesive component here denotes the total amount of the components used, which include the reactive monomers or reactive resins (a), the activator (b), the radical initiator (c), the polymeric film former matrix (d) and/or further components which are optionally present, which is obtained as a total (in % by weight).

In a preferred embodiment according to the invention, the at least one second adhesive component B comprises a mixture of the following constituents: thermoplastic polyurethane, in particular Desmomelt 530®, 2-phenoxyethyl methacrylate, 2-hydroxyethyl methacrylate, 2-hydroxypropyl methacrylate, ethylene glycol dimethacrylate and iron (II) phthalocyanine.

In a further preferred embodiment according to the invention, the at least one second adhesive component B comprises a mixture of the following constituents: thermoplastic polyurethane, in particular Desmomelt 530®, 2-phenoxyethyl methacrylate, 2-hydroxyethyl methacrylate, ethylene glycol dimethacrylate and iron(II) phthalocyanine.

In a further preferred embodiment according to the invention, the at least one second adhesive component B comprises the following constituents: iron(II) phthalocyanine.

In a preferred embodiment, the second adhesive component comprises (i) from 0.1 to 5% by weight activator (b), preferably from 0.5 to 2% by weight activator (b), or (ii) from 20 to 80% by weight of at least one reactive monomer or reactive resin (a) and from 0.1 to 5% by weight activator (b), preferably from 40 to 60% by weight of at least one reactive monomer or reactive resin (a) and from 0.5 to 2% by weight activator (b), or (iii) from 20 to 80% by weight polymeric film former matrix (d), from 20 to 80% by weight of at least one reactive monomer or reactive resin (a) and from 0.1 to 5% by weight activator (b), preferably from 30 to 50% by weight polymeric film-forming reagent (d), from 40 to 60% by weight of at least one reactive monomer or reactive resin (a) and from 0.5 to 2% by weight activator (b), based on the total mixture of the constituents of the reactive adhesive component. The total mixture of the constituents of the reactive adhesive component here denotes the total amount of the components used, which include the reactive monomers or reactive resins (a), the activator (b), the radical initiator (c), the polymeric film former matrix (d) and/or further components which are optionally present, which is obtained as a total (in % by weight).

The reactive adhesive components A and/or B in film form according to the invention generally have a layer thickness in the range of approximately from 20 to 200 µm, preferably approximately from 30 to 100 µm, more preferably approximately from 40 to 60 µm and particularly preferably approximately 50 µm. For the production of greater layer thicknesses, it can be advantageous to laminate a plurality of adhesive film layers together.

The reactive adhesive components A and B according to the invention are additionally characterized in that they preferably have pressure sensitive adhesive properties. Pressure sensitive adhesive substances are defined according to Römpp (Römpp Online 2013, document identifier RD-08-00162) as viscoelastic adhesives whose set, dried film is permanently tacky and remains adhesive at room temperature. Pressure sensitive adhesion takes place immediately to almost all substrates by the application of gentle pressure. Gentle pressure here means a pressure of greater than 0 bar, which is exerted for a period of more than 0 seconds.

Reactive Adhesive System

According to the invention, the first and the second reactive adhesive component as described above are used for a reactive adhesive system which is characterized in that the first reactive adhesive component A comprises at least one reactive monomer or reactive resin (a) and a radical initiator (c) and the second adhesive component B comprises at least one reactive monomer or reactive resin (a) and an activator (b) and wherein the activator (b) comprises a manganese(II) complex, iron(II) complex or cobalt(II) complex, in each case with a compound selected from porphyrin, porphyrazine or phthalocyanine or derivative of one of those compounds as ligand.

Alternatively, the reactive adhesive system according to the invention is characterized in that it comprises at least two reactive adhesive components A and B, wherein the first adhesive component A comprises at least one reactive monomer or reactive resin (a) and a radical initiator (c) and the second adhesive component comprises an activator (b) and wherein the activator (b) comprises a manganese(II) complex, iron(II) complex or cobalt(II) complex, in each case with a compound selected from porphyrin, porphyrazine or phthalocyanine or a derivative of one of those compounds as ligand.

In a preferred embodiment, the reactive adhesive system of the present invention is provided in film form:

This adhesive film system is characterized in that it comprises at least two reactive adhesive components or adhesive films A and B, wherein the first adhesive component A comprises at least one reactive monomer or reactive resin (a), a radical initiator (c) and a polymeric film former matrix (d) and the second adhesive component comprises at least one reactive monomer or reactive resin (a), an activator (b) and a polymeric film former matrix (d) and wherein the activator (b) comprises a manganese(II) complex, iron(II) complex or cobalt(II) complex, in each case with a compound selected from porphyrin, porphyrazine or phthalocyanine or a derivative of one of those compounds as ligand.

Alternatively, the reactive adhesive system in film form according to the invention is characterized in that it comprises at least two reactive adhesive components or adhesive films A and B, wherein the first adhesive component A comprises at least one reactive monomer or reactive resin (a), a radical initiator (c) and a polymeric film former matrix (d) and the second adhesive component comprises an activator (b) and optionally a polymeric film former matrix (d) and wherein the activator (c) comprises a manganese(II) complex, iron(II) complex or cobalt(II) complex, in each case with a compound selected from porphyrin, porphyrazine or phthalocyanine or a derivative of one of those compounds as ligand.

There is additionally provided according to the invention a reactive adhesive system comprising two or more first adhesive components A or second adhesive components B, as defined above, and optionally further backings, release papers and/or release liners, wherein the two or more first adhesive components A or second adhesive components B are each present alternately.

The first and second reactive adhesive components A and B crosslink and cure as soon as they are brought into contact over a large area under moderate pressure, in particular from 0.5 to 3 bar, at room temperature (23° C.). Higher or lower temperatures are optionally also possible. The mentioned moderate pressure is in particular to be achievable by hand. According to the invention, the contact time at room temperature is from a few seconds to a few minutes, preferably from 10 to 60 seconds. The pressure can be applied mechanically or manually.

If the two reactive adhesive components A and B as described above are applied beforehand to the substrates to be adhesively bonded, permanent adhesive bonding of the substrates occurs as a result of the above-described crosslinking. Alternatively, it is also possible first to apply adhesive component A to the first substrate to be adhesively bonded and to apply adhesive component B to adhesive component A. The second substrate to be adhesively bonded is then applied to adhesive component B.

Furthermore, the reactive adhesive system of the invention can comprise further films, layers, adhesives, as well as permanent or temporary backings.

Suitable backing materials are known to a skilled person in the field. For example, films (polyesters, PET, PE, PP, BOPP, PVC, polyimides), nonwovens, foams, woven fabrics and/or fabric foils can be used as permanent backings. Temporary backings should be provided with a release layer, wherein the release layer generally consists of a silicone release coating or a fluorinated release coating or is polyolefinic in nature (HDPE, LDPE).

It may be necessary to pretreat the surfaces of the substrates to be adhesively bonded by means of a physical, chemical and/or physico-chemical method. The application of a primer or of an adhesion promoter composition, for example, is advantageous in this case.

Substrates

Suitable substrates which are suitable for adhesive bonding by means of the reactive adhesive system according to the invention are metals, glass, wood, concrete, stone, ceramics, textiles and/or plastics materials. The substrates to be adhesively bonded can be the same or different.

In a preferred embodiment, the reactive adhesive system according to the invention is used for adhesively bonding metals, glass and plastics materials. In a particularly preferred embodiment according to the invention, polycarbonates and anodized aluminum are adhesively bonded.

The metal substrates which are to be adhesively bonded can generally be manufactured from any common metals and metal alloys. Metals such as, for example, aluminum, stainless steel, steel, magnesium, zinc, nickel, brass, copper, titanium, iron-containing metals and alloys are preferably used. The parts to be adhesively bonded can additionally be composed of different metals.

Suitable plastics substrates are, for example, acrylonitrile-butadiene-styrene copolymers (ABS), polycarbonates (PC), ABS/PC blends, PMMA, polyamides, glass fiber reinforced polyamides, polyvinyl chloride, polyvinylene fluoride, cellulose acetate, cycloolefin copolymers, liquid crystal polymers (LCP), polylactide, polyether ketones, polyetherimide, polyethersulfone, polymethacrylmethylimide, polymethylpentene, polyphenyl ether, polyphenylene sulfide, polyphthalamide, polyurethanes, polyvinyl acetate, styrene-acrylonitrile copolymers, polyacrylates and polymethacrylates, polyoxymethylene, acrylic ester-styrene-acrylonitrile copolymers, polyethylene, polystyrene, polypropylene and/or polyesters, such as, for example, polybutylene terephthalates (PBT) and/or polyethylene terephthalate (PET).

Substrates can be painted, printed, metallized or sputtered.

The substrates to be adhesively bonded can assume any desired form which is required for the use of the resulting composite body. In the simplest form, the substrates are flat. In addition, three-dimensional substrates, which are sloping, for example, can also be adhesively bonded using the reactive adhesive system according to the invention. The substrates to be adhesively bonded can also have a wide variety of functions, such as, for example, casing, viewing window, stiffening elements, etc.

Method for Producing a Reactive Adhesive Component in Film Form

The reactive adhesive films (adhesive components in film form) according to the invention are produced by the method described hereinbelow:

In a first step, the ingredients are dissolved or finely distributed in one or more solvent(s) and/or water. Alternatively, a solvent and/or water is not necessary because the ingredients are already completely soluble in one another (optionally with the action of heat and/or shear). Suitable solvents are known in the art, wherein preference is given to the use of solvents in which at least one of the ingredients has good solubility. Acetone is particularly preferred.

As used herein, the term ingredient includes either at least one reactive monomer (a), a radical initiator (b) and a polymeric film former matrix (d) or at least one reactive monomer (a), an activator (b) and a polymeric film former matrix (d) as well as optionally further additives and/or auxiliary substances as defined above.

The dissolved or finely distributed ingredients are then mixed in a second step. Conventional stirring devices are used to produce the mixture. The solution is optionally additionally heated. The ingredients are optionally dissolved or finely distributed and mixed simultaneously.

The first step and the second step can also take place in one step, that is to say the ingredients are dissolved and/or finely distributed simultaneously.

In a third step, a release paper, a backing material or a pressure sensitive adhesive is then coated with the mixture of the dissolved or finely distributed ingredients according to step 2. Coating is carried out by the conventional techniques known in the art.

After the coating, the solvent is removed in a fourth step by evaporation.

The reactive adhesive film can optionally be wound up into a roll in a further step.

For storage, the reactive adhesive films according to the invention are covered with a release liner or release paper.

Alternatively, the reactive adhesive films according to the invention are produced in a solvent- and water-free manner by extrusion, hot melt nozzle coating or calendering.

Kit for Preparing the 2-Component Adhesive System According to the Invention

According to the invention there is additionally provided a kit for preparing a reactive 2-component adhesive system, preferably in film form. The kit comprises at least one first reactive adhesive component A which comprises an initiator, in particular a radical initiator, as described above, and at least one second reactive adhesive component B which comprises an activator as described above.

The kit according to the invention is typically used as follows:

The at least one first adhesive component A is applied to a surface of a substrate to be adhesively bonded. In addition, the at least one second adhesive component B is applied to a surface of a second substrate to be adhesively bonded. Adhesive component A and adhesive component B are brought into contact and left in contact for pressing times in the range of from a few seconds to several minutes at room temperature (23° C.), whereby the polymerization reaction starts and the adhesive cures. Alternatively, it is also possible to apply the at least one second adhesive component B to the first adhesive component A, and only then apply thereto the surface of a second substrate to be adhesively bonded.

The above-described process can optionally be repeated in order thus to achieve adhesive bonding of the layers substrate-A-B-A-B-substrate or substrate-B-A-B-substrate or substrate-A-B-A-substrate, etc. This can be advantageous if the properties of pressure sensitive adhesion between the substrates to be adhesively bonded and the first and second adhesive components A and B are different.

Composite Body

Finally, there is provided according to the invention a composite body which is adhesively bonded by means of the reactive adhesive system according to the invention as defined above or by means of the kit according to the invention as defined above.

Experimental Part

The examples below serve to illustrate the present invention but are not to be interpreted as limiting the scope of protection in any way.

Preparation of the Solution of the Film-Forming Polymer
PU Solution:

A 20% solution of the film-forming polymer in acetone is prepared by first weighing 120 g of Desmomelt 530® and 480 g of acetone into a screw top jar and closing the screw top jar. The Desmomelt 530® is dissolved completely by rolling the screw top jar on a roller bench for several days. Depending on the rolling speed, the operation lasts approximately from one to seven days. Alternatively, the acetonic solution can also be prepared by stirring the Desmomelt 530® granules in acetone by means of a commercial laboratory stirrer.

Preparation of Reactive Components A and B
Component A1:

100.0 g of 2-phenoxyethyl methacrylate are mixed with 10.0 g of cumene hydroperoxide for 10 minutes by means of a commercial laboratory stirrer so that a homogeneous mixture forms.

Component B1:

Component B1 is iron(II) phthalocyanine in powder form (grade: Sigma-Aldrich, purity approximately 90%).

Component B2:

5.0 g of iron(II) phthalocyanine are stirred in 50.0 g of acetone for 10 minutes by means of a commercial laboratory stirrer so that a mixture with dissolved portions forms.

Preparation of Reactive Components A and B with Film-Forming Polymer: Components A-P and B-P
Component A-P1:

150.0 g of the 20% solution of Desmomelt 530® in acetone (PU solution) are mixed with 25.3 g of 2-phenoxyethyl methacrylate, 19.0 g of 2-hydroxyethyl methacrylate, 12.7 g of 2-hydroxypropyl methacrylate, 3.0 g of ethylene glycol dimethacrylate and 10.0 g of cumene hydroperoxide for 10 minutes by means of a commercial laboratory stirrer so that a homogeneous mixture forms.

The percentage composition of component A-P1 is given in the following table together with the described weighed portions:

| | Component A-P1 | | |
|---|---|---|---|
| | Wt. % solid* | Weighed portion (g) with solvent | Wt. % with solvent |
| PU solution | 30.0 | 150.0 | 68.1 |
| 2-Phenoxyethyl methacrylate | 25.3 | 25.3 | 11.5 |
| 2-Hydroxyethyl methacrylate | 19.0 | 19.0 | 8.7 |
| 2-Hydroxypropyl methacrylate | 12.7 | 12.7 | 5.8 |
| Ethylene glycol dimethacrylate | 3.0 | 3.0 | 1.4 |
| Cumene hydroperoxide | 10.0 | 10.0 | 4.5 |
| Total | 100.0 | 220.0 | 100.0 |

*Solid is here understood as meaning all substances that are not solvents. Solvent here is only acetone.

Component A-P2:

200.0 g of the 20% solution of Desmomelt 530® in acetone (PU solution) are mixed with 20.9 g of 2-phenoxyethyl methacrylate, 26.2 g of 2-hydroxyethyl methacrylate, 3.0 g of ethylene glycol dimethacrylate and 10.0 g of cumene hydroperoxide for 10 minutes by means of a commercial laboratory stirrer so that a homogeneous mixture forms.

The percentage composition of component A-P2 is given in the following table together with the described weighed portions:

| | Component A-P2 | | |
|---|---|---|---|
| | Wt. % solid* | Weighed portion (g) with solvent | Wt. % with solvent |
| PU solution | 40.0 | 200.0 | 76.8 |
| 2-Phenoxyethyl methacrylate | 20.9 | 20.9 | 8.0 |
| 2-Hydroxyethyl methacrylate | 26.2 | 26.2 | 10.1 |
| Ethylene glycol dimethacrylate | 3.0 | 3.0 | 1.2 |
| Cumene hydroperoxide | 10.0 | 10.0 | 3.9 |
| Total | 100.0 | 260.0 | 100.0 |

*Solid is here understood as meaning all substances that are not solvents. Solvent here is only acetone.

Component B-P1:

150.0 g of the 20% solution of Desmomelt 5300 in acetone (PU solution) are mixed with 29.3 g of 2-phenoxyethyl methacrylate, 22.4 g of 2-hydroxyethyl methacrylate, 14.3 g of 2-hydroxypropyl methacrylate, 3.0 g of ethylene glycol dimethacrylate and 1.0 g of iron(II) phthalocyanine for 10 minutes by means of a commercial laboratory stirrer so that a mixture with dissolved portions forms.

The percentage composition of component B-P1 is given in the following table together with the described weighed portions:

| Component B-P1 | | | |
|---|---|---|---|
| | Wt. % solid* | Weighed portion (g) with solvent | Wt. % with solvent |
| PU solution | 30.0 | 150.0 | 68.1 |
| 2-Phenoxyethyl methacrylate | 29.3 | 29.3 | 13.3 |
| 2-Hydroxyethyl methacrylate | 22.4 | 22.4 | 10.2 |
| 2-Hydroxypropyl methacrylate | 14.3 | 14.3 | 6.5 |
| Ethylene glycol dimethacrylate | 3.0 | 3.0 | 1.4 |
| Iron(II) phthalocyanine | 1.0 | 1.0 | 0.5 |
| Total | 100.0 | 220.0 | 100.0 |

*Solid is here understood as meaning all substances that are not solvents. Solvent here is only acetone.

Component B-P2:

200.0 g of the 20% solution of Desmomelt 530® in acetone (PU solution) are mixed with 24.9 g of 2-phenoxyethyl methacrylate, 31.1 g of 2-hydroxyethyl methacrylate, 3.0 g of ethylene glycol dimethacrylate and 1.0 g of iron(II) phthalocyanine for 10 minutes by means of a commercial laboratory stirrer so that a mixture with dissolved portions forms.

The percentage composition of component B-P2 is given in the following table together with the described weighed portions:

| Component B-P2 | | | |
|---|---|---|---|
| | Wt. % solid* | Weighed portion (g) with solvent | Wt. % with solvent |
| PU solution | 40.0 | 200.0 | 76.8 |
| 2-Phenoxyethyl methacrylate | 24.9 | 24.9 | 9.6 |
| 2-Hydroxyethyl methacrylate | 31.1 | 31.1 | 12.0 |
| Ethylene glycol dimethacrylate | 3.0 | 3.0 | 1.2 |
| Iron(II) phthalocyanine | 1.0 | 1.0 | 0.4 |
| Total | 100.0 | 260.0 | 100.0 |

*Solid is here understood as meaning all substances that are not solvents. Solvent here is only acetone.

Component B-P3:

150.0 g of the 20% solution of Desmomelt 530® in acetone (PU solution) are mixed with 29.3 g of 2-phenoxyethyl methacrylate, 22.4 g of 2-hydroxyethyl methacrylate, 14.3 g of 2-hydroxypropyl methacrylate, 3.0 g of ethylene glycol dimethacrylate and 1.0 g of manganese(II) phthalocyanine for 10 minutes by means of a commercial laboratory stirrer so that a mixture with dissolved portions forms.

The percentage composition of component B-P3 is given in the following table together with the described weighed portions:

| Component B-P3 | | | |
|---|---|---|---|
| | Wt. % solid* | Weighed portion (g) with solvent | Wt. % with solvent |
| PU solution | 30.0 | 150.0 | 68.1 |
| 2-Phenoxyethyl methacrylate | 29.3 | 29.3 | 13.3 |
| 2-Hydroxyethyl methacrylate | 22.4 | 22.4 | 10.2 |
| 2-Hydroxypropyl methacrylate | 14.3 | 14.3 | 6.5 |
| Ethylene glycol dimethacrylate | 3.0 | 3.0 | 1.4 |
| Manganese(II) phthalocyanine | 1.0 | 1.0 | 0.5 |
| Total | 100.0 | 220.0 | 100.0 |

*Solid is here understood as meaning all substances that are not solvents. Solvent here is only acetone.

Component B-P4:

150.0 g of the 20% solution of Desmomelt 5300 in acetone (PU solution) are mixed with 29.3 g of 2-phenoxyethyl methacrylate, 22.4 g of 2-hydroxyethyl methacrylate, 14.3 g of 2-hydroxypropyl methacrylate, 3.0 g of ethylene glycol dimethacrylate and 1.0 g of cobalt(II) phthalocyanine for 10 minutes by means of a commercial laboratory stirrer so that a mixture with dissolved portions forms.

The percentage composition of component B-P4 is given in the following table together with the described weighed portions:

| Component B-P4 | | | |
|---|---|---|---|
| | Wt. % solid* | Weighed portion (g) with solvent | Wt. % with solvent |
| PU solution | 30.0 | 150.0 | 68.1 |
| 2-Phenoxyethyl methacrylate | 29.3 | 29.3 | 13.3 |
| 2-Hydroxyethyl methacrylate | 22.4 | 22.4 | 10.2 |
| 2-Hydroxypropyl methacrylate | 14.3 | 14.3 | 6.5 |
| Ethylene glycol dimethacrylate | 3.0 | 3.0 | 1.4 |
| Cobalt(II) phthalocyanine | 1.0 | 1.0 | 0.5 |
| Total | 100.0 | 220.0 | 100.0 |

*Solid is here understood as meaning all substances that are not solvents. Solvent here is only acetone.

Production of the Reactive Adhesive Films KF-A-P and KF-B-P

Adhesive Film KF-A-P1:

Component A-P1 is applied to a siliconized polyester film (release film) by means of a commercial laboratory coating table (for example from SMO (Sondermaschinen Oschersleben GmbH)) with a coating knife. The acetone is then evaporated off for 10 minutes at 60° C. in a circulating air drying cabinet. The gap width during coating is so adjusted that, after evaporation of the solvent, a 50 µm thick film is obtained. The tacky reactive adhesive film KF-A-P1 obtained is covered with a second siliconized polyester film and stored until adhesive bonding.

Adhesive Film KF-A-P2:

Component A-P2 is applied to a siliconized polyester film (release film) by means of a commercial laboratory coating table (for example from SMO (Sondermaschinen Oschersleben GmbH)) with a coating knife. The acetone is then evaporated off for 10 minutes at 60° C. in a circulating air drying cabinet. The gap width during coating is so adjusted that, after evaporation of the solvent, a 50 µm thick film is obtained. The tacky reactive adhesive film KF-A-P2 obtained is covered with a second siliconized polyester film and stored until adhesive bonding.

Adhesive Film KF-B-P1:

Component B-P1 is applied to a siliconized polyester film (release film) by means of a commercial laboratory coating table (for example from SMO (Sondermaschinen Oschersleben GmbH)) with a coating knife. The acetone is then evaporated off for 10 minutes at 60° C. in a circulating air drying cabinet. The gap width during coating is so adjusted that, after evaporation of the solvent, a 50 µm thick film is obtained. The tacky reactive adhesive film KF-B-P1 obtained is covered with a second siliconized polyester film and stored until adhesive bonding.

Adhesive Film KF-B-P2:

Component B-P2 is applied to a siliconized polyester film (release film) by means of a commercial laboratory coating table (for example from SMO (Sondermaschinen Oschersleben GmbH)) with a coating knife. The acetone is then evaporated off for 10 minutes at 60° C. in a circulating air drying cabinet. The gap width during coating is so adjusted that, after evaporation of the solvent, a 50 µm thick film is obtained. The tacky reactive adhesive film KF-B-P2 obtained is covered with a second siliconized polyester film and stored until adhesive bonding.

Adhesive Film KF-B-P3:

Component B-P3 is applied to a siliconized polyester film (release film) by means of a commercial laboratory coating table (for example from SMO (Sondermaschinen Oschersleben GmbH)) with a coating knife. The acetone is then evaporated off for 10 minutes at 60° C. in a circulating air drying cabinet. The gap width during coating is so adjusted that, after evaporation of the solvent, a 50 µm thick film is obtained. The tacky reactive adhesive film KF-B-P3 obtained is covered with a second siliconized polyester film and stored until adhesive bonding.

Adhesive Film KF-B-P4:

Component B-P4 is applied to a siliconized polyester film (release film) by means of a commercial laboratory coating table (for example from SMO (Sondermaschinen Oschersleben GmbH)) with a coating knife. The acetone is then evaporated off for 10 minutes at 60° C. in a circulating air drying cabinet. The gap width during coating is so adjusted that, after evaporation of the solvent, a 50 µm thick film is obtained. The tacky reactive adhesive film KF-B-P4 obtained is covered with a second siliconized polyester film and stored until adhesive bonding.

Production of the Reactive Kneadable Adhesive Masses KM-A-P and KM-B-P

Adhesive Mass KM-A-P1:

Adhesive mass KM-A-P1 is obtained by kneading the adhesive film KF-A-P1. Kneading is carried out by hand. It can also be carried out in a commercial kneader (for example a laboratory kneader from Haake). Alternatively, the adhesive mass KM-A-P1 can also be obtained by the extrusion method from component A-P1 after the solvent has first been removed from the component, for example in a degassing extruder. All the operations for producing the adhesive mass KM-A-P1 are carried out in the temperature range of from room temperature (23° C.) to a maximum of 50° C.

Adhesive Mass KM-B-P1:

Adhesive mass KM-B-P1 is obtained by kneading the adhesive film KF-B-P1. Kneading is carried out by hand. It can also be carried out in a commercial kneader (for example a laboratory kneader from Haake). Alternatively, the adhesive mass KM-B-P1 can also be obtained by the extrusion method from component B-P1 after the solvent has first been removed from the component, for example in a degassing extruder. All the operations for producing the adhesive mass KM-B-P1 are carried out in the temperature range of from room temperature (23° C.) to a maximum of 50° C.

Preparation of Samples for the Push-Out Test

Round die-cut pieces having a diameter of 21 mm were punched out of the adhesive films KF-A-P1, KF-A-P2, KF-B-P1 and KF-B-P2 to be tested, which were each covered on both sides with a release liner. The release liners were then removed from one side of each die-cut piece. The die-cut pieces KF-A-P1 and KF-A-P2 were each placed accurately on a round test disc ("disc", first substrate, first test specimen) likewise having a diameter of 21 mm. The die-cut pieces KF-A-P1 and KF-A-P2 each adhered to the "disc". Test specimens with test discs of polycarbonate, glass and those with test discs of steel were prepared in the same manner (see table). The release paper still remaining on the die-cut pieces KF-A-P1 and KF-A-P2 was then removed. The discs were thus provided either with KF-A-P1 or with KF-A-P2.

The die-cut pieces KF-B-P1 were each placed with the uncovered side on the die-cut piece KF-A-P1 adhering to the disc, so that the die-cut pieces KF-B-P1 each adhered to the die-cut pieces KF-A-P1. In the same manner, the die-cut pieces KF-B-P2 were each placed with the uncovered side on the die-cut piece KF-A-P2 adhering to the disc, so that the die-cut pieces KF-B-P2 each adhered to the die-cut pieces KF-A-P2. After contacting of KF-A-P1 with KF-B-P1, or of KF-A-P2 with KF-B-P2, subsequent adhesive bonding with the second substrate must take place within a maximum of one hour.

For further preparation of the adhesive bonds, the last release liner still remaining on the die-cut pieces KF-B-P1 and KF-B-P2 was removed so that the die-cut pieces KF-B-P1 and KF-B-P2 were each exposed. In a test variant, the die-cut piece KF-A-P1 freed of the release liner was again placed on the exposed die-cut piece KF-B-P1 so that the die-cut piece sequence KF-A-P1/KF-B-P1/KF-A-P1 was obtained. The remaining release liner was then again removed from the die-cut piece KF-A-P1 so that die-cut piece KF-A-P1 was exposed and an adhesive bond test specimen/KF-A-P1/KF-B-P1/KF-A-P1/test specimen could be produced (see table).

Adhesive Bonding for the Push-Out Test

The second substrate (second test specimen) was a square perforated plate made of polycarbonate (PC), glass or steel (see table); side lengths 40 mm in each case, with a centrally arranged round hole (hole diameter 9 mm) in the square plate.

The round test specimens provided with the mutually adhering die-cut pieces KF-A-P1 and KF-B-P1, and the round test specimens provided with the mutually adhering die-cut pieces KF-A-P2 and KF-B-P2 and, in the test variant, the round test specimens provided with the mutually adhering die-cut pieces KF-A-P1, KF-B-P1 and KF-A-P1, were positioned with the exposed side of the die-cut piece on the perforated plate so that the center of the round test specimen and the center of the hole in the perforated plate were located one above the other. The composite held together by the tackiness of the die-cut pieces and consisting of the square perforated plate, die-cut piece KF-A-P1, die-cut piece KF-B-P1 and the disc, or of the square perforated plate, die-cut piece KF-A-P2, die-cut piece KF-B-P2 and the disc, or in the test variant of the square perforated plate, die-cut piece KF-A-P1, die-cut piece KF-B-P1, die-cut piece KF-A-P1 and the disc, was placed on a table in such a manner that the square perforated plate was on the bottom. A weight of 2 kg was placed on the disc. The composite was exposed to the permanent pressure of the weight a) for 10 seconds and in a second test series b) for 60 seconds, in each case at room temperature (pressing time). The weight was then removed. The composite was subsequently stored for 24 hours at 23° C. and 50% relative humidity. During that time, a gradually progressing curing reaction within the die-cut pieces took place and a gradually increasing adhesion between the die-cut pieces and with the substrates (test specimens) occurred. Adhesive bonding thus took place with a gradual increase in strength over time which significantly exceeded the original strength achieved by pressure sensitive adhesion. The push-out test was then carried out.

Push-Out Test

The push-out test provides information about the adhesive bonding strength of an adhesive product which adheres on both sides in the direction of the normal of the adhesive layer. To that end, pressure was applied to the round test specimen ("disc") perpendicularly through the hole in the perforated plate at a constant rate of 10 mm/minute by means of a mandrel clamped in a tensile tester (that is to say parallel to the normal vector on the test specimen plane; centered centrally at the middle of the hole) until the adhesive bond loosened sufficiently that a pressure drop of 50% was recorded. The pressure acting immediately before the pressure drop is the maximum pressure $P_{max}$. This value corresponds to the push-out value [N/mm$^2$] indicated in the table. All the measurements were carried out in a temperature-controlled chamber at 23° C. and 50% relative humidity.

Preparation of Samples for Determining the Tensile Shear Strength

Rectangular die-cut pieces measuring 25.0 mm×12.5 mm were punched out of the adhesive films KF-A-P1, KF-A-P2, KF-B-P1, KF-B-P2, KF-B-P3 and KF-B-P4 to be tested, each of which was covered with a release paper on both sides. The release papers were then removed from one side of each die-cut piece.

The die-cut pieces KF-A-P1 and KF-A-P2 were each placed accurately on the end of a first test specimen (substrate) measuring 100.0 mm×25.0 mm×3.0 mm. The die-cut pieces KF-A-P1 and KF-A-P2 each adhered to the test specimen. Test specimens with first test specimens of polycarbonate, glass and steel were prepared in that manner (see table). The release paper still remaining on the die-cut pieces KF-A-P1 and KF-A-P2 was then removed. These first test specimens were thus provided either with KF-A-P1 or with KF-A-P2.

The die-cut pieces KF-B-P1, KF-B-P3 and KF-B-P4 were each placed with the uncovered side on the die-cut piece KF-A-P1 adhering to the first test specimen, so that the die-cut pieces KF-B-P1, KF-B-P3 and KF-B-P4 each adhered to the die-cut pieces KF-A-P1. In the same manner, the die-cut pieces KF-B-P2 were each placed with the uncovered side on the die-cut piece KF-A-P2 adhering to the first test specimen, so that the die-cut pieces KF-B-P2 each adhered to the die-cut pieces KF-A-P2. After contacting KF-A-P1 with KF-B-P1, or KF-A-P1 with KF-B-P3, KF-A-P1 with KF-B-P4 and KF-A-P2 with KF-B-P2, subsequent adhesive bonding with the second test specimen must take place within a maximum of one hour.

For further preparation of the adhesive bonds, the last release liner still remaining on the die-cut pieces KF-B-P1, KF-B-P2, KF-B-P3 and KF-B-P4 was removed so that the die-cut pieces KF-B-P1, KF-B-P2, KF-B-P3 and KF-B-P4 were each exposed. In a test variant, the die-cut piece KF-A-P1 freed of the release liner was again placed on the exposed die-cut piece KF-B-P1 so that the die-cut piece sequence KF-A-P1/KF-B-P1/KF-A-P1 was obtained. The remaining release liner was then again removed from the die-cut piece KF-A-P1 so that die-cut piece KF-A-P1 was exposed and an adhesive bond first test specimen/KF-A-P1/KF-B-P1/KF-A-P1/second test specimen could be produced (see table).

Alternatively to the die-cut pieces KF-B-P1 and KF-B-P2, components B1 and B2 were also used for preparing samples. To that end, the first test specimens provided with KF-A-P1 and those provided with KF-A-P2 were each sprinkled uniformly thinly with component B1, so that component B1 was evenly distributed on the surface of KF-A-P1 or KF-A-P2 but did not cover the surface. Alternatively, KF-A-P1 and KF-A-P2 were brushed thinly with component B2. After sprinkling or brushing, subsequent bonding with the second test specimen must take place within a maximum of one hour.

Alternatively to the die-cut pieces KF-A-P1 and KF-A-P2, the liquid components A1, A-P1 and A-P2 were also used for preparing samples. To that end, the liquid components A1, A-P1 and A-P2 were each applied by means of a brush to the end of a first test specimen measuring 100.0 mm×25.0 mm×3.0 mm so that an area of at least 25.0 mm×12.5 mm was covered with the component in question. After waiting for five minutes until the solvent of components A-P1 and A-P2 had evaporated, component B1 was sprinkled uniformly thinly onto A1, A-P1 and A-P2, so that component B1 was evenly distributed on the surface of A1, A-P1 and A-P2 but did not cover the surface.

As a further alternative, component B-P1 was applied thinly to A-P1 by means of a brush after the solvent had evaporated. Likewise, component B-P2 was applied thinly to A-P2 by means of a brush after the solvent had evaporated. Again, a period of five minutes was allowed for the solvent of components B-P1 and B-P2 to evaporate. After sprinkling or brushing, the subsequent adhesive bonding with the second test specimen must take place within a maximum of one hour.

As a further alternative to the die-cut pieces KF-A-P1 and KF-A-P2, the adhesive mass KM-A-P1 was used. This was placed on the end of a first test specimen measuring 100.0 mm×25.0 mm×3.0 mm so that it adhered thereto and covered an area of at least 25.0 mm×12.5 mm. The thickness of the adhesive mass KM-A-P1 was approximately 0.5 mm. Component B1 was then sprinkled uniformly thinly onto KM-A-P1 so that component B1 was evenly distributed on the surface of KM-A-P1 but did not cover the surface. Alternatively, the adhesive mass KM-B-P1 present in a layer thickness of approximately 0.5 mm was placed on KM-A-P1 in such a manner that the two adhesive masses adhered to one another. Subsequent adhesive bonding with the second test specimen must take place within a maximum of one hour.

Adhesive Bond for Determining the Tensile Shear Strength

The second test specimens were each placed flush with one end on the chemically reacting adhesive system of the samples prepared as described in the last section so that, as described in DIN EN 1465, an overlapping composite was obtained in each case. The length of overlap was in each case 12.5 mm. The area of overlap was in each case 300 mm$^2$. The overlapping composites consisting of first test specimen/reacting adhesive system/second test specimen were placed on a table. A weight of 2 kg was placed on the second test specimen in each case. The composite was exposed to the permanent pressure of the weight a) for 10 seconds and, in a second test series, b) for 60 seconds, in each case at room temperature (pressing time). The weight was then removed. The composite was subsequently stored for 24 hours at 23° C. and 50% relative humidity. During that time, a gradually progressing curing reaction within the adhesive system took place and gradually increasing adhesion between the adhesive system and the test specimens occurred. Adhesive bonding thus took place with a gradual increase in strength over time which significantly exceeded the original strength due to pressure sensitive adhesion. The tensile shear strength was then determined.

Determination of the Tensile Shear Strength

Determining the tensile shear strength of overlapping adhesive bonds provides information about the shear strength of an adhesive product which adheres on both sides. The determination was carried out according to DIN EN 1465 by means of a tensile tester. The test speed was 10 mm/minute. All the measurements were performed in a climate-controlled chamber at 23° C. and 50% relative humidity.

Results

Push-out test

| | Adhesive system | Pressing time/pressing temperature | PC/PC | Push-out [N/mm²] Glass/ glass | Steel/ steel |
|---|---|---|---|---|---|
| Example 1 | KF-A-P1/ KF-B-P1 | 10 sec/23° C. 60 sec/23° C. | 1.4 (C) 1.7 (C) | 0.9 (MF) 1.0 (MF) | 1.2 (A) 1.4 (A) |
| Example 2 | KF-A-P2/ KF-B-P2 | 10 sec/23° C. 60 sec/23° C. | 1.5 (C) 2.2 (C) | 1.1 (MF) 0.9 (MF) | 1.1 (C) 1.5 (C) |
| Example 3 | KF-A-P1/ KF-B-P1/ KF-A-P1 | 10 sec/23° C. 60 sec/23° C. | 1.5 (C) 1.7 (C) | 1.0 (MF) 0.9 (MF) | 1.4 (A) 1.4 (C) |
| Comparative example | KF-A-P2 | 10 sec/23° C. 60 sec/23° C. | <0.1 (C) <0.1 (C) | n.d. n.d. | n.d. n.d. |

A = adhesive failure between die-cut piece and test specimen.
C = cohesive failure within the die-cut piece composite.
MF = material failure of the test specimen.
n.d. = not determined.

Tensile shear strength test

| | Adhesive system | Pressing time/pressing temperature | PC/PC | Tensile shear strength [N/mm²] Glass/ glass | Steel/ steel |
|---|---|---|---|---|---|
| Example 1 | KF-A-P1/ KF-B-P1 | 10 sec/23° C. 60 sec/23° C. | 3.5 (C) 3.6 (C) | 1.4 (MF) 1.5 (MF) | 2.7 (A) 2.9 (A) |
| Example 2 | KF-A-P1/ KF-B-P3 | 10 sec/23° C. 60 sec/23° C. | 3.7 (C) 3.8 (C) | 1.4 (MF) 1.5 (MF) | 2.6 (A) 2.6 (A) |
| Example 3 | KF-A-P1/ KF-B-P4 | 10 sec/23° C. 60 sec/23° C. | 2.7 (C) 2.5 (C) | 1.4 (MF) 1.5 (MF) | 2.1 (A) 2.3 (A) |
| Example 4 | KF-A-P2/ KF-B-P2 | 10 sec/23° C. 60 sec/23° C. | 3.7 (C) 3.9 (C) | 1.5 (MF) 1.5 (MF) | 3.1 (C) 3.0 (C) |
| Example 5 | KF-A-P1/ KF-B-P1/ KF-A-P1 | 10 sec/23° C. 60 sec/23° C. | 3.5 (C) 3.8 (C) | 1.4 (MF) 1.5 (MF) | 2.9 (C) 2.5 (C) |
| Example 6 | KF-A-P1/ B1 | 10 sec/23° C. 60 sec/23° C. | 2.5 (C) 2.5 (C) | n.d. n.d. | 1.8 (C) 2.2 (C) |
| Example 7 | KF-A-P2/ B1 | 10 sec/23° C. 60 sec/23° C. | 2.7 (C) 2.9 (C) | n.d. n.d. | 2.6 (C) 2.8 (C) |
| Example 8 | KF-A-P1/ B2 | 10 sec/23° C. 60 sec/23° C. | 2.9 (C) 3.0 (C) | n.d. n.d. | 3.1 (C) 3.0 (C) |
| Example 9 | KF-A-P2/ B2 | 10 sec/23° C. 60 sec/23° C. | 3.6 (C) 3.8 (C) | n.d. n.d. | 3.3 (C) 3.0 (C) |
| Example 10 | A1/B1 | 10 sec/23° C. 60 sec/23° C. | 1.8 (C) 1.5 (C) | n.d. n.d. | 1.3 (A) 1.1 (A) |
| Example 11 | A-P1/B1 | 10 sec/23° C. 60 sec/23° C. | 2.3 (C) 2.2 (C) | n.d. n.d. | 1.4 (A) 1.3 (A) |
| Example 12 | A-P2/B1 | 10 sec/23° C. 60 sec/23° C. | 2.9 (C) 2.6 (C) | n.d. n.d. | 1.6 (A) 1.3 (A) |
| Example 13 | A-P1/B-P1 | 10 sec/23° C. 60 sec/23° C. | 3.3 (C) 3.5 (C) | n.d. n.d. | 2.5 (C) 2.7 (C) |
| Example 14 | A-P2/B-P2 | 10 sec/23° C. 60 sec/23° C. | 3.6 (C) 3.9 (C) | n.d. n.d. | 2.9 (C) 3.1 (C) |
| Example 15 | KM-A-P1/ B1 | 10 sec/23° C. 60 sec/23° C. | 1.1 (C) 1.3 (C) | n.d. n.d. | 1.2 (C) 1.1 (C) |
| Example 16 | KM-A-P1/ KM-B-P1 | 10 sec/23° C. 60 sec/23° C. | 0.8 (C) 1.3 (C) | n.d. n.d. | 0.7 (C) 1.3 (C) |
| Comparative example | KF-A-P2 | 10 sec/23° C. 60 sec/23° C. | <0.1 (C) <0.1 (C) | n.d. n.d. | n.d. n.d. |

A = adhesive failure between die-cut piece and test specimen.
C = cohesive failure within the die-cut piece composite.
MF = material failure of the test specimen.
n.d. = not determined.

These results show that, by means of the reactive adhesive system according to the invention, two substrates (test specimens) can be adhesively bonded at room temperature after a short pressing time with a strength which significantly exceeds the strength of typical pressure sensitive adhesives.

The reactive adhesive system according to the invention permits improved adhesive bonding and, at the same time, improved usability. Mixing of two components prior to adhesive bonding is not required.

The invention claimed is:

1. A reactive adhesive system comprising:
    (i) at least one first adhesive component A comprising at least one reactive monomer or reactive resin (a) and a radical initiator (c); and
    (ii) at least one second adhesive component B comprising a reactive adhesive component comprising an activator (b), wherein the activator (b) comprises a manganese (II) complex, iron(II) complex or cobalt(II) complex, in each case with a ligand comprising a compound selected from porphyrin, porphyrazine or phthalocyanine or a derivative of one of those compounds;
    wherein the first adhesive component A and/or the second adhesive component B further comprise a polymeric film former matrix (d).

2. The reactive adhesive system as claimed in claim 1, wherein the first adhesive component A and the second adhesive component B are present in film form.

3. The reactive adhesive system as claimed in claim 2, further comprising backings, release papers and/or release liners.

4. The reactive adhesive system as claimed in claim 1, comprising two or more first adhesive components A or second adhesive components B and optionally further backings, release papers and/or release liners,
    wherein the two or more first adhesive components A or second adhesive components B are each present alternately.

5. The reactive adhesive system as claimed in claim 1, wherein
    (A) the first adhesive component A comprises:
        (i) from 20 to 80% by weight of at least one reactive monomer (a) and from 2 to 30% by weight radical initiator (c); or (ii) from 20 to 80% by weight polymeric film former matrix (d), from 20 to 80% by weight of at least one reactive monomer (a) and from 2 to 30% by weight radical initiator (c); and (B) the second adhesive component B comprises:
(i) from 0.1 to 5% by weight activator (b); or
(ii) from 20 to 80% by weight of at least one reactive monomer (a) and from 0.1 to 5% by weight activator (b); or
(iii) from 20 to 80% by weight polymeric film former matrix (d), from 20 to 80% by weight of at least one reactive monomer (a) and from 0.1 to 5% by weight activator (b).

6. The reactive adhesive system as claimed in claim 1, wherein:
(i) the reactive monomer (a) comprises at least one representative selected from acrylic acid, acrylic acid esters, methacrylic acid, methacrylic acid esters, diacrylates, dimethacrylates, triacrylates, trimethacrylates, higher functional acrylates, higher functional methacrylates, vinyl compounds and/or oligomeric or polymeric compounds having carbon-carbon double bonds, preferably methyl methacrylate, methacrylic acid, cyclohexyl methacrylate, tetrahydrofurfuryl methacrylate, 2-phenoxyethyl methacrylate, di(ethylene glycol) methyl ether methacrylate, 2-hydroxyethyl methacrylate, 2-hydroxypropyl methacrylate, 4-hydroxybutyl methacrylate and/or ethylene glycol dimethacrylate; and/or
(ii) the radical initiator (c) comprises a peroxide, preferably $\alpha,\alpha$-dimethylbenzyl hydroperoxide; and/or
(iii) the polymeric film former matrix (d) comprises a thermoplastic polymer, preferably a thermoplastic polyurethane, an elastomer and/or a thermoplastic elastomer.

7. A method of adhesively bonding a material selected from the group consisting of metal, wood, glass and/or plastics materials, said method comprising adhering components A and/or B of the reactive system according to claim 1 to said material.

8. A method for producing the reactive adhesive system as claimed in claim 1, wherein the method comprises the following steps:
(i) dissolving and/or finely distributing the ingredients in one or more solvent(s) and/or water;
(ii) mixing the dissolved or finely distributed ingredients;
(iii) coating a release liner or release paper, a backing material or a pressure sensitive adhesive with the mixture of dissolved or distributed ingredients according to step (ii);
(iv) evaporating the solvent and/or water; and
(v) optionally winding the reactive adhesive component into a roll;

wherein the ingredients comprise:
(A) at least one reactive monomer (a), a radical initiator (b) and a polymeric film former matrix (d); or
(B) at least one reactive monomer (a), an activator (b) and a polymeric film former matrix (d);
and optionally further additives and/or auxiliary substances.

9. A kit for the preparation of a two-component adhesive system as claimed in claim 1, comprising at least one first reactive adhesive component which comprises a radical initiator and at least one second reactive adhesive component comprising an activator (b), wherein the activator (b) comprises a manganese(II) complex, iron(II) complex or cobalt(II) complex, in each case with a ligand comprising a compound selected from porphyrin, porphyrazine or phthalocyanine or a derivative of one of those compounds.

10. A composite body which is bonded by means of the reactive adhesive system as claimed in claim 1.

11. The reactive adhesive component according to claim 1, wherein the reactive monomer (a) comprises at least one representative selected from acrylic acid, acrylic acid esters, methacrylic acid, methacrylic acid esters, diacrylates, dimethacrylates, triacrylates, trimethacrylates, higher functional acrylates, higher functional methacrylates, vinyl compounds and/or oligomeric or polymeric compounds having carbon-carbon double bonds.

12. The reactive adhesive component according to claim 11, wherein the reactive monomer (a) comprises at least one representative selected from methyl methacrylate, methacrylic acid, cyclohexyl methacrylate, tetrahydrofurfuryl methacrylate, 2-phenoxyethyl methacrylate, di(ethylene glycol) methyl ether methacrylate, 2-hydroxyethyl methacrylate, 2-hydroxypropyl methacrylate, 4-hydroxybutyl methacrylate and/or ethylene glycol dimethacrylate.

13. The reactive adhesive component as claimed in claim 1, wherein the activator (b) comprises manganese(II) phthalocyanine, iron(II) phthalocyanine or cobalt(II) phthalocyanine.

* * * * *